Sept. 1, 1931.  K. IMHOFF  1,820,977
COMPLETE SEWAGE TREATMENT PLANT WITH SUBMERGED CONTACT AERATORS
Filed Nov. 9, 1927
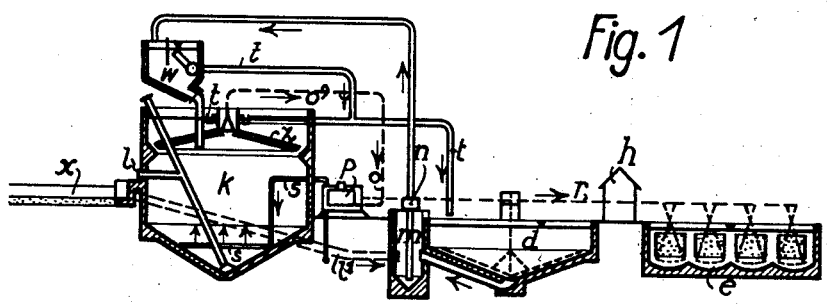
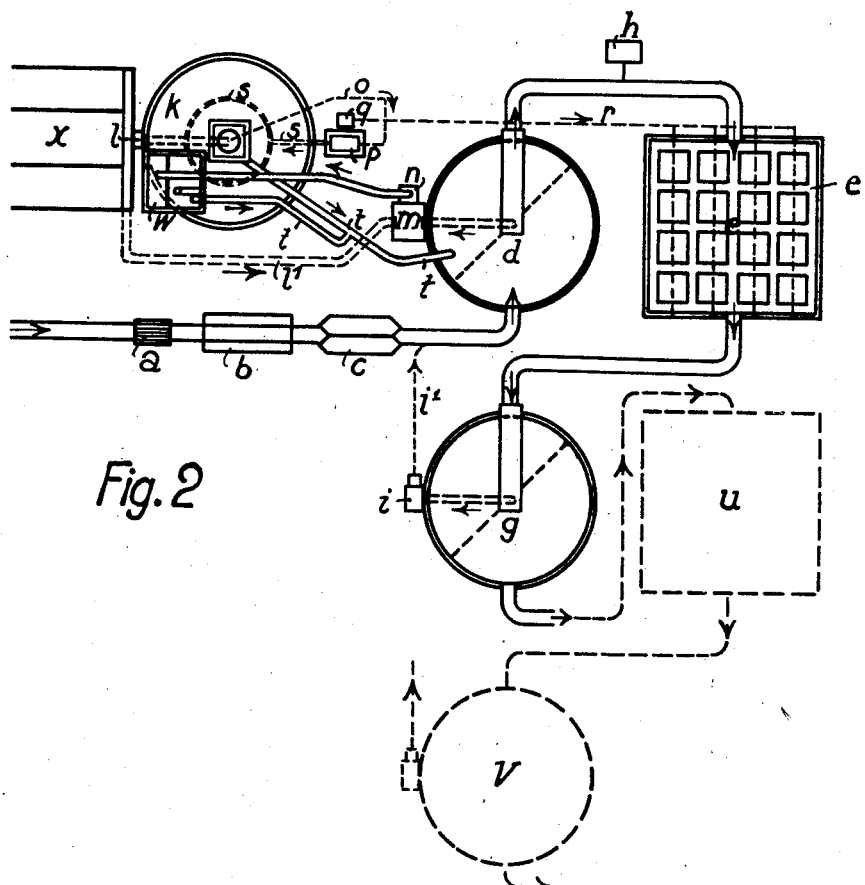

Patented Sept. 1, 1931

1,820,977

UNITED STATES PATENT OFFICE

KARL IMHOFF, OF ESSEN, GERMANY

COMPLETE SEWAGE TREATMENT PLANT WITH SUBMERGED CONTACT AERATORS

Application filed November 9, 1927. Serial No. 232,169.

With the sewage treatment by submerged contact aerators it is advantageous to let the latter work in a separate tank and to effect the mechanical pre-settling as well as the mechanical final settling of the sewage in locally separate settling basins. This is of particular importance for settling basins having scrapers for the removal of the sludge. The machines required for this purpose can be worked in an easier way if the settling basins are quite independent of the contact aerators.

The present invention relates to an improved sewage treatment plant embodying this idea.

The accompanying drawings represent by way of example how the invention can be put into practice:

Figs. 1 and 2 are respectively a longitudinal section through part of, and a plan view of, the improved sewage treatment plant.

The sewage flows, first, through a screen $a$, an oil catcher $b$, and a grit chamber $c$, into the pre-settling basin $d$, then, into the tank $e$ occupied by the submerged contact aerators, and, finally, into the final settling basin $g$. The pre-settling basin $d$ and final settling basin $g$ are fitted with the known Dorr scrapers, diagrammatically indicated by the broken diametric lines extending across the basins $d$ and $g$, the sludge being thereby pushed to the middle and escaping with natural fall. From the pre-settling basin $d$ the sludge flows into the pump shaft $m$. Hence, it is raised by the pump $n$ into the separate sludge digestion chamber $k$. On its travel thereto, the sludge can be freed from the excess water in a separate chamber $w$, said water flowing through the overflow pipe $t$ back into the settling basin $d$. From the sludge digestion chamber $k$ the digested sludge is let-off through the pipe $l$ on to the drying place $x$. Part thereof can, however, be returned through the pipe $l^1$ to the pump shaft $m$, so that there it is mixed with the fresh sludge and thus by the pump $n$ not only fresh sludge but a mixture of fresh and digested sludge is raised into the sludge digestion chamber. This is of importance for obviating the noxious acid fermentation. From the sludge digestion chamber $k$ the digestion gases are caught by means of a gas hood $z$ and led through the pipe $o$ into the gas motor $p$. Said motor drives the blower $q$ wherein the compressed-air is produced, which is led through the pipe $r$ to the submerged contact aerators in the tank $e$. By means of the same motor, also the oscillating motion of the air pipes below the contact aerators in the tank $e$ can be produced. The gas motor is cooled by water from an ordinary water supply, the hot cooling water being led through the pipe $s$ into the bottom end of the digestion chamber whereby the latter is heated. The overflow water flows through the pipe $t$ back to the settling basin $d$.

The sludge from the final settling basin $g$ is raised by a pump $i$ and pipe $i^1$ into the inflow of the sewage to the pre-settling basin $d$. This has the advantage that said biological sludge, which separately is difficulty digestible, is well mixed with the sludge of the pre-settling basin, prior to its being brought into the sludge digestion chamber. A further advantage is that thereby less unnecessary sludge water is brought into the sludge digestion chamber $k$, because the biological sludge from the final settling basin $g$ loses a great portion of the sludge water during its simultaneous treatment with the sludge in the pre-settling basin $d$.

If the purification of the sewage obtained in the contact aerator tank does not suffice, it is possible to further treat the sewage by adding to the plant a second contact aerator tank $u$ and a second final settling basin $v$. The sludge from the latter is also pumped into the inflow of the sewage to the pre-settling basin $d$. If required, it is even possible to add further additional contact aerator tanks and final settling basins.

The precipitation of the light biological sludge in the final settling basins can be facilitated by adding to the sewage, for instance at $h$, a chemical precipitation agent.

What I claim, is:

1. In a sewage treatment plant, a pre-settling basin having an inflow and a separate final settling basin, a tank having submerged contact aerators, pipe connections between said basin and tank including a connection for delivering sludge from the pre-settling basin to the tank and a connection for delivering sludge from the tank to the final settling basin, a sludge digestion chamber and means for conducting sludge thereto from the pre-settling basin, and means for delivering biological sludge from the final settling basin to the inflow of the pre-settling basin there to be mixed with the sludge of the pre-settling basin prior to delivery to the digestion chamber.

2. In a sewage treatment plant, a pre-settling basin having an inflow and a separate final settling basin, a tank having submerged contact aerators, pipe connections between said basin and tank including a connection for delivering sludge from the pre-settling basin to the tank and a connection for delivering sludge from the tank to the final settling basin, a sludge digestion chamber, means for conducting sludge from the pre-settling basin to the digestion chamber including a mixing chamber, an effluent connection for removing part of the sludge from the digestion chamber to the mixing chamber where to mix digested sludge and fresh sludge before delivery to the digestion chamber, and means for delivering biological sludge from the final settling basin to the inflow of the pre-settling basin there to mix with the sludge of the pre-settling basin prior to delivery to the mixing chamber.

3. In a sewage treatment plant, a pre-settling basin having an inflow and a separate final settling basin, for precipitating biological sludge a tank having submerged contact aerators, pipe connections between said basins and tank including a connection for delivering sludge from the pre-settling basin to the tank and a connection for delivering sludge from the tank to the final settling basin, a connection for delivering biological sludge to said inflow for producing a biological sludge mixture in the pre-settling basin, a sludge digestion chamber, means for conducting the biological sludge mixture from the pre-settling basin to the digestion chamber including a mixing chamber and pump for pumping the mixed sludge to the digestion chamber and means for leading off the excess water from the mixed sludge prior to its supply to the digestion chamber.

4. In a sewage treatment plant, a tank having submerged contact aerators, two settling basins consisting of a pre-settling basin connected with the tank to deliver sludge thereto and a final settling basin to receive sludge from the tank, connections for pumping biological sludge from the final settling basin into the inflow of sewage to the pre-settling basin, to produce a biological sludge mixture in the pre-settling basin, a sludge digestion chamber and means for heating the same, means for conducting the biological sludge mixture from the pre-settling basin to the digestion chamber including a mixing chamber and pump for pumping the mixed sludge to the digestion chamber, and an effluent connection for removing part of the sludge from the digestion chamber to the mixing chamber.

5. In a sewage treatment plant, a pre-settling basin receiving the sewage inflow, a separate final settling basin, a separate tank having submerged contact aerators, pipe connections between said basins and tank, to pass sludge from the pre-settling basin to the tank and from the tank to the final settling basin, a sludge digestion chamber having associated therewith an excess water chamber, a mixing chamber receiving sludge from the pre-settling basin, means for conducting mixed sludge from the mixing chamber to the excess water chamber for therein freeing the mixed sludge of excess water prior to passage to the digestion chamber, an overflow pipe conveying the overflow from the excess water chamber to the pre-settling basin, means for returning part of the digested sludge from the digesting chamber to the mixing chamber, thereby adding digested sludge to the mixture, and means for delivering biological sludge from the final settling basin to the inflow to the pre-settling basin there to be mixed with the sludge of the pre-settling basin prior to delivery to the mixing chamber.

In testimony whereof I have hereunto set my hand.

KARL IMHOFF.